June 30, 1942.  J. A. MARX, JR  2,288,535
SEAT FOR AUTOMOBILES
Filed Feb. 5, 1940
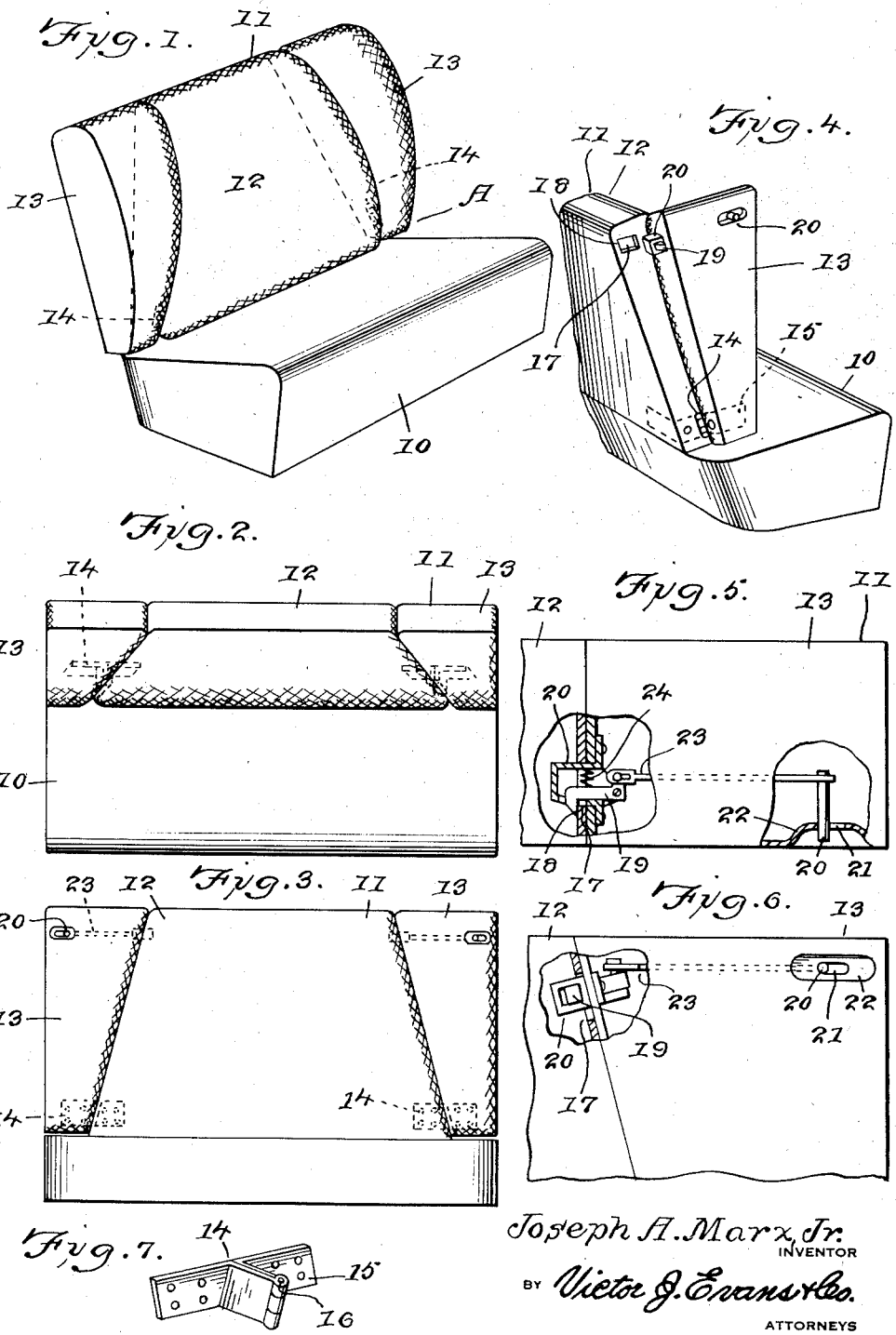
Joseph A. Marx, Jr.
INVENTOR
BY Victor J. Evans & Co.
ATTORNEYS Patented June 30, 1942

2,288,535

UNITED STATES PATENT OFFICE 2,288,535

SEAT FOR AUTOMOBILES

Joseph A. Marx, Jr., Saginaw, Mich.

Application February 5, 1940, Serial No. 317,400

2 Claims. (Cl. 155—5)

The invention relates to a seat for an automobile and more especially to a back construction for front seats built within the coach style automobiles.

The primary object of the invention is the provision of a seat of this character wherein the same when built within the coach body of a motor vehicle enables access to the rear seat within said body without requiring an occupant of the front seat leaving the latter for this purpose and also avoids the raising of the front seat to give entrance to the rear of the body of the vehicle for the occupancy of the rear seat therein.

Another object of the invention is the provision of a seat of this character wherein the back thereof is of a construction so that portions of the same can be swung to a position allowing the passing to the back by a person entering the doorway of a vehicle body at the front area thereof in that a rear entrance to the body is lacking in the coach style or type of body construction and in this manner access will be had to the rear seat within the body without unduly disturbing the occupant of the front seat therein or requiring the vacating of the same as is generally necessary for the making of such entrance to the rear of the vehicle body.

A further object of the invention is the provision of a seat of this character wherein the seat proper is permanently built within the coach style or type of body construction for an automobile while the back to the seat is of novel construction rendering it easy and convenient for a person or persons to enter the rear of the body through the front entrance thereof without disturbing the occupant of the front seat or the necessity for vacating the same.

A still further object of the invention is the provision of a seat of this character wherein the back thereof is of novel construction so that the bodily lifting or moving of the front seat within the coach style of body of an automobile is avoided to allow for the entry to the rear of the body for the occupancy of the rear seat thereof or for making an exit from the rear of the body of the occupants of the rear seat.

A still further object of the invention is the provision of a seat of this character, which is simple in its construction, thoroughly reliable and efficient in the operation thereof for the purposes intended of the same, maintaining the conventional appearance to the front seat built within the coach style or type of body for a motor vehicle, readily and easily operated to allow entrance of a person into the back seat or the exit of the person from the body without inconvenience to the occupant or occupants of the front seat therein, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a perspective view of a seat constructed in accordance with the invention.

Figure 2 is a top plan view thereof.

Figure 3 is a rear elevation.

Figure 4 is a fragmentary perspective view looking toward one end of the seat showing the back adjusted for effecting a clearance for the entrance or exit of a person to and from the rear seat of the coach type of vehicle body construction.

Figure 5 is a fragmentary top plan view partly in section showing in detail the fastener for the seat back sections.

Figure 6 is a fragmentary rear elevation of the seat partly broken away for illustrating details of construction.

Figure 7 is a perspective view of a hinge employed in the seat.

Similar reference characters indicate corresponding parts throughout the several views in the drawing.

Referring to the drawing in detail, A designates generally a seat structure in its entirety adapted for build within the coach type of body of a motor vehicle and this body, as is conventional, is built with a front seat and a rear seat, both seats being accessible through the front of the body in that a single doorway is created at each side of the body forwardly thereof for entrance and exit purposes. This seat A comprises a cushioned seat section proper 10, being of the usual construction, and in this instance is permanently installed within the body as a part of the front seat within. Rising from the seat proper 10 is a back 11 involving a fixed intermediate or center portion 12 and swingable outer or end portions 13, respectively. The portions 13 are sections independent of the intermediate or center portion or section 12 of the back 11.

Each section 11 is downwardly tapered inversely to the upwardly tapered formation of the intermediate portion or section 12 so that the latter at the uppermost part thereof is of decreased width to the lower part, which is the wider part of said portion or section; while the upper part of each section 13 is the wider part thereof; and the narrow part, which is the lower portion of the said section, is connected to the portion or section 12 at the wider part thereof by a double-leaf hinge 14. The leaves 15 of this hinge are fastened to the portions 12 and 13 and are bent to locate the hinge pintle 16 in the joint between each portion 13 and the portion 12 so that on the swinging of the portion 13 it will move forwardly to a position at substantially right angles to the portion 12. Thus in this position of the portion 13 a clearance will be had between the side wall of the coach body and the back 11 in its entirety of the seat A to allow free entrance and exit to and from the rear seat within the body of the said vehicle without necessitating a person vacating the front seat A when occupied as is customary in the use of the coach type of body for a motor vehicle in that the front seat has to be lifted or moved bodily for such entrance or exit to and from the body.

Normally the portions or sections 13 are aligned with the portion or section 12 so that the back 11 in its entirety is usable when the front seat A is occupied.

To latch each portion or section 13 in its normally aligned relationship to the portion or section 12 of the back 11, there is built into this portion or section 12 a recess 17 and an edge 18 therefor creating a keeper for engagement by a swinging latch 19 confined within a housing 20 built within the portion or section 13 and of a size and kind for introduction into the recess 17 to have the latch 19 engage with the keeper edge 18 and thus lock or latch the said portion or section 13 in its aligned relation to the portion or section 12.

The latch 19 is controlled for the release thereof by a finger-engaging lug 20 slidable in and exposed through a slot 21 created within the rearmost wall of the portion or section 13. This wall about the slot 21 is countersunk, as at 22, to eliminate the protruding of the finger-engaging lug 20 outwardly beyond the outer face of the said wall. This finger-engaging lug 20 has the connection 23 with the latch 19, which is spring-pressed at 24 to latching position. The finger-engaging lug 20 when manually actuated operates the latch 19 for releasing or unlatching the portion or section 13 whereby it may be swung to the position at substantially right angles to the portion or section 12, as is disclosed in Figure 4 of the drawing. This results in creating a sufficient clearance at one end of the front seat A for entrance and exit to and from the rear of the vehicle body, past the front seat A within said body and without requiring discomfort to the occupant of the front seat or the necessity of vacating the same for such purpose.

What is claimed is:

1. A seat, comprising a seat proper, a sectional back, one of the back sections being fixedly associated with the seat proper, a swinging section hinged at its lower edge to the edge of the fixed back section, a housing carried by the upper end of the edge of the swinging section and adapted to enter an opening in the upper end of the edge of the fixed section, and a latch within the housing for locking the swinging section in its normal position.

2. A seat, comprising a seat proper, a sectional back, one of the sections being fixedly associated with the seat proper, a swinging section hinged at its lower edge to the edge of the fixed back section, a rectangular housing carried by the upper end of the edge of the swinging section and adapted to enter and closely fit the rectangular opening in the upper end of the edge of the fixed section, and a latch within the housing and extending out through one side wall thereof and engaging the fixed section on the inside of the rectangular opening.

JOSEPH A. MARX, Jr.